(12) United States Patent
Mattes et al.

(10) Patent No.: US 6,672,615 B2
(45) Date of Patent: Jan. 6, 2004

(54) SYSTEM FOR DEACTIVATING AN AIRBAG FIRING DEVICE

(75) Inventors: Bernhard Mattes, Sachsenheim (DE); Siegfried Malicki, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/936,113

(22) PCT Filed: Dec. 21, 2000

(86) PCT No.: PCT/DE00/04567

§ 371 (c)(1),
(2), (4) Date: Feb. 1, 2002

(87) PCT Pub. No.: WO01/49533

PCT Pub. Date: Jul. 12, 2001

(65) Prior Publication Data

US 2003/0006593 A1 Jan. 9, 2003

(30) Foreign Application Priority Data

Jan. 7, 2000 (DE) ............................. 100 00 376
Jun. 20, 2000 (DE) ............................. 100 30 248

(51) Int. Cl.⁷ ............................................. B60R 21/32
(52) U.S. Cl. ................... 280/735; 180/271; 180/287; 307/10.1
(58) Field of Search .......................... 280/735; 180/282, 180/271, 287, 274; 307/10.1; 340/438, 440, 436, 669

(56) References Cited

U.S. PATENT DOCUMENTS

| 3,863,208 | A | * | 1/1975 | Balban | 280/735 |
|---|---|---|---|---|---|
| 5,232,243 | A | * | 8/1993 | Blackburn et al. | 280/732 |
| 5,330,226 | A | * | 7/1994 | Gentry et al. | 280/735 |
| 5,409,258 | A | * | 4/1995 | Kawabata | 280/735 |
| 5,544,914 | A | | 8/1996 | Borninski et al. | |
| 5,690,356 | A | * | 11/1997 | Lane, Jr. | 280/735 |
| 5,739,757 | A | | 4/1998 | Gioutsos | |
| 5,816,611 | A | * | 10/1998 | Parn | 280/735 |
| 5,866,954 | A | * | 2/1999 | Daniel et al. | 307/10.1 |
| 5,882,035 | A | | 3/1999 | Munro | |
| 5,892,433 | A | * | 4/1999 | Fulda | 340/438 |
| 5,915,725 | A | * | 6/1999 | Cuddihy et al. | 280/735 |
| 5,992,880 | A | * | 11/1999 | Cuddihy et al. | 280/735 |
| 6,007,093 | A | * | 12/1999 | Bechtle et al. | 280/735 |
| 6,029,105 | A | * | 2/2000 | Schweizer | 701/45 |
| 6,040,637 | A | * | 3/2000 | Paganini et al. | 307/10.1 |
| 6,045,156 | A | * | 4/2000 | Spell et al. | 280/735 |
| 6,133,648 | A | * | 10/2000 | Titus et al. | 307/10.2 |
| 6,145,874 | A | * | 11/2000 | Modzelewski et al. | 280/735 |
| 6,152,483 | A | * | 11/2000 | Quigley | 280/735 |
| 6,164,693 | A | * | 12/2000 | Mattes et al. | 280/735 |
| 6,189,923 | B1 | * | 2/2001 | Tsubone | 280/735 |
| 6,206,415 | B1 | * | 3/2001 | Cuddihy et al. | 280/735 |
| 6,250,670 | B1 | * | 6/2001 | Lehnst | 280/735 |
| 6,250,672 | B1 | * | 6/2001 | Ryan et al. | 280/735 |
| 6,329,911 | B1 | * | 12/2001 | Lehnst | 340/436 |
| 6,371,516 | B1 | * | 4/2002 | Miyagawa | 280/735 |
| 6,378,899 | B1 | * | 4/2002 | Fujimoto | 280/735 |
| 6,422,595 | B1 | * | 7/2002 | Breed et al. | 280/735 |
| 6,456,915 | B1 | * | 9/2002 | Fendt et al. | 701/45 |

FOREIGN PATENT DOCUMENTS

| DE | 196 17 250 | 9/1997 |
|---|---|---|
| DE | 197 24 344 | 8/1998 |
| DE | 198 35 709 | 11/1999 |
| EP | 0 603 733 | 6/1994 |

* cited by examiner

Primary Examiner—Paul N. Dickson
Assistant Examiner—Deanna Draper
(74) Attorney, Agent, or Firm—Kenyon & Kenyon

(57) ABSTRACT

So that, given a desired deactivation of an airbag, a triggering cannot take place under any circumstances, a firing device of the airbag is bypassed using an electrically controllable switch. This switch short-circuits the electric circuit of the firing device during the deactivation time.

10 Claims, 2 Drawing Sheets

SYSTEM FOR DEACTIVATING AN AIRBAG FIRING DEVICE

FIELD OF THE INVENTION

The present invention relates to a system for deactivating a firing device for an airbag installed in a vehicle, circuit means being provided which prevent a current flow through the firing device during a desired deactivation time.

BACKGROUND INFORMATION

In the past, there have been a number of cases in which children who were sitting on the front passenger seat of the vehicle in a child seat directed backwards have suffered fatal injuries due to the triggering of the passenger-side airbag. These accidents could have been prevented by deactivating the passenger-side airbag. In general, there are situations in which activation of the passenger-side airbag is superfluous, for example, when the front passenger seat is not occupied by a person at all, but rather some object such as a piece of luggage is placed on it. There are systems and devices already known, which are mentioned in German Patent No. 197 24 344 C1, for detecting such situations in which the passenger-side airbag should be deactivated. Image-processing systems, which can detect whether the front passenger seat is occupied by a child seat or a person or an object and what distance the person is from the passenger-side airbag so that in critical occupancy situations the airbag can be deactivated, are very costly. Another device for detecting seat occupancy is composed of a mat, integrated into the front passenger seat, which changes its electrical resistance or its capacitance as a function of a force or pressure influence. Thus, this mat has the function of a weight sensor to determine whether the seat is occupied by a grown person or a child.

Furthermore, there are sensors which detect the presence of a backward-facing child seat on the front passenger seat. Among these are sensors which are based on an electromagnetic transponder principle, transmitters and receivers being disposed on the child seat and in the front passenger seat. European Patent No. 06 037 33 B1 describes an arresting device, also known under the name ISOFIX, for a child seat on the front passenger seat of a vehicle. The child seat is located in position by detent elements, present on the child seat, which can engage with a fixing device on the front passenger seat. A sensor detects the engagement of the detent elements and, in so doing, emits a pulse which is supplied to a control unit for deactivating the passenger-side airbag.

The simplest device for deactivating a passenger-side airbag is a manually operable switch which, as is derived from German Patent No. 197 24 344 C1 and U.S. Pat. No. 5,544,914, has a first switching position for activating and a second switching position for deactivating the firing device of the airbag.

All these indicated systems function such that they interrupt the electric circuit of the firing device to deactivate the passenger-side airbag. However, there have also been situations in which the passenger-side airbag has been triggered, even though it has been deactivated by software-programmed interruption of the firing circuit. Causes to be considered are possible malfunctions of a microcontroller in the airbag control unit, or even a direct irradiation of sufficiently great electromagnetic energy from outside into the supply lines of the firing devices. In the same way, short circuits to plus and minus of the battery voltage due to vehicle-body deformations caused by impacts could be responsible for triggering the airbag.

Therefore, an object of the present invention is to provide a system of the type indicated at the outset, which reliably ensures that under no circumstances can an unwanted triggering of the airbag occur.

SUMMARY OF THE INVENTION

According to the present invention, the firing device is bypassed with the aid of a switch, electrically controllable by the circuit means, which short-circuits the electric circuit of the firing device during the deactivation time. The result of this short-circuiting switch bypassing the firing device is that no current causing a triggering of the firing device, regardless of how this current is formed, can flow through the firing device.

Particularly to deactivate the passenger-side airbag when the front passenger seat is occupied in the ways mentioned at the outset, means are provided that signal such situations in which the firing device must not be triggered. For example, these means advantageously include a switch, operable by hand, or a sensory mechanism which detects the manner in which the seat is occupied. Or the means interact with a detent device with which a child seat is located in position on the front passenger seat of a vehicle, the means signaling a non-triggering case when the detent device is engaged.

Very great security against a false airbag triggering is ensured in that the circuit means keep the switch closed continuously, so that the firing device is short-circuited, and that the circuit means only open the switch when either a triggering or a diagnosis of the firing device is to be carried out.

For a diagnosis of the firing device, the switch is preferably opened at predefined time intervals for a duration of approximately 20 $\mu$s. This time is less than the minimal firing lag time, which the firing device normally needs in response to a current flow, in order to trigger.

The electrically controllable switch is advantageously a field-effect transistor.

A first visual display can be provided which lights up in response to a short circuit of the electric circuit of the firing device, and a second display can be provided which lights up in response to a malfunction of the short-circuiting switch.

DETAILED DESCRIPTION

Figure 1:
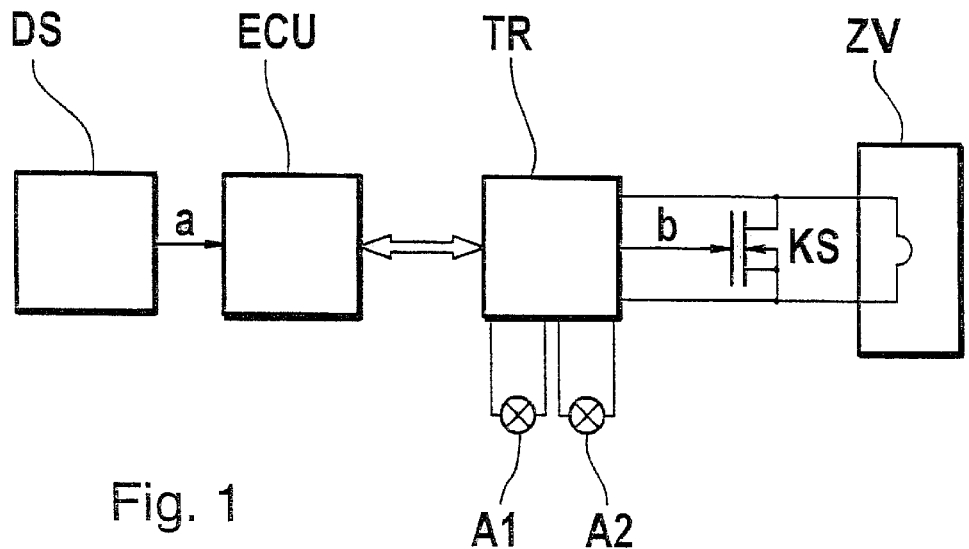
FIG. 1 shows a block diagram of a first embodiment for driving the firing device of an airbag.

Circuit block DS shown in FIG. 1 symbolizes deactivation circuit means which emit a deactivation signal a when the seat occupancy on the front passenger seat forbids activation of the passenger-side airbag in the event of a crash. As already mentioned at the outset, among these are, for example, the occupancy of the front passenger seat by a backward-directed child seat, or when no person is on the front passenger seat. In the simplest case, deactivation circuit means DS can be composed of a switch operable by hand, or a sensory mechanism which detects the type of seat occupancy, particularly a backward-facing child seat. Several known sensor systems were set forth in the introduction.

Deactivation signal a, emitted by circuit block DS, is supplied to a control unit ECU. In dependence on acceleration-sensor signals, with the aid of a suitable algorithm, this control unit ECU decides whether or not firing device ZV for the passenger-side airbag should be triggered in the event of a vehicle crash. When a passenger-side airbag is spoken of here and in the following, also meant by this are all other airbags (e.g. side airbags, knee bags, head airbags and the like) which are installed to protect the front-seat passenger in the vehicle.

With deactivation signal a, control unit ECU receives the information that a non-triggering case exists for the passenger-side airbag. Control unit ECU triggers a driver circuit TR for firing device ZV accordingly. Firing device ZV is bypassed by an electrically controllable short-circuiting switch KS, preferably a field-effect transistor (MOSFET). In the non-triggering case, driver circuit TR generates a control signal b for short-circuiting switch KS, which thereby switches into the conductive state and consequently short-circuits the electric circuit of firing device ZV. Thus, if a current, for whatever reasons, is flowing in the electric circuit of firing device ZV, it is shunted via short-circuiting switch KS. As a result, a triggering of firing device ZV can therefore not occur. The passenger-side airbag would thus be reliably deactivated for this case.

Control unit ECU receives deactivation signal a via a signal path which is completely independent of a signal path via which a triggering signal, conditioned upon an impact, is supplied by a microcontroller.

As soon as control unit ECU signals to driver circuit TR that short-circuiting switch KS is to be closed for deactivating the passenger-side airbag, driver circuit TR activates a display A1, whereby the deactivation state of the passenger-side airbag is displayed in the vehicle.

As a rule, control unit ECU carries out a functional diagnosis of firing device ZV. This diagnosis lies in periodically measuring the resistance of the firing device. If this resistance deviates by a specific amount from a predefined reference value, then a second display A2, connected to driver circuit TR, is activated to indicate such a fault case. If the firing circuit is short-circuited via short-circuiting switch KS, control unit ECU would have to determine a resistance of approximately 0 Ω in the diagnosis. Should short-circuiting switch KS be defective, then a resistance deviating from 0 Ω would be measured. Thus, a diagnosis of short-circuiting switch KS can be carried out by control unit ECU, as well. Should a fault be detected in short-circuiting switch KS, then display A2 would likewise be activated.

Figure 2:
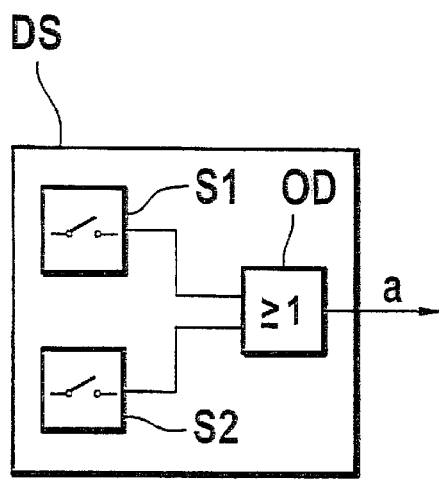
FIG. 2 shows deactivation circuit means for the case when a child seat is directed backwards.

FIG. 2 shows schematically a special example for deactivation circuit means DS. In the case of this deactivation circuit means DS, the assumption is a backward-directed child seat which, as described in European Patent No. EP 06 037 33 B1, is equipped with two detent elements that are able to engage with a fixing device on the front passenger seat. Each of the two detent elements is provided with a switch S1, S2 which closes when the corresponding detent element on the child seat engages with the fixing device on the front passenger seat. With the closing of switches S1, S2, a deactivation signal a is emitted for control unit ECU. Since it can happen by mistake that only one of the two detent elements on the child seat is properly engaged with the fixing device on the front passenger seat, but the fact that a child seat is on the front passenger seat must be detectable for this case as well, provision is made in circuit block DS for an OR gate OD which already emits a deactivation signal a when only one of the two switches S1, S2 is closed.

Figure 3:
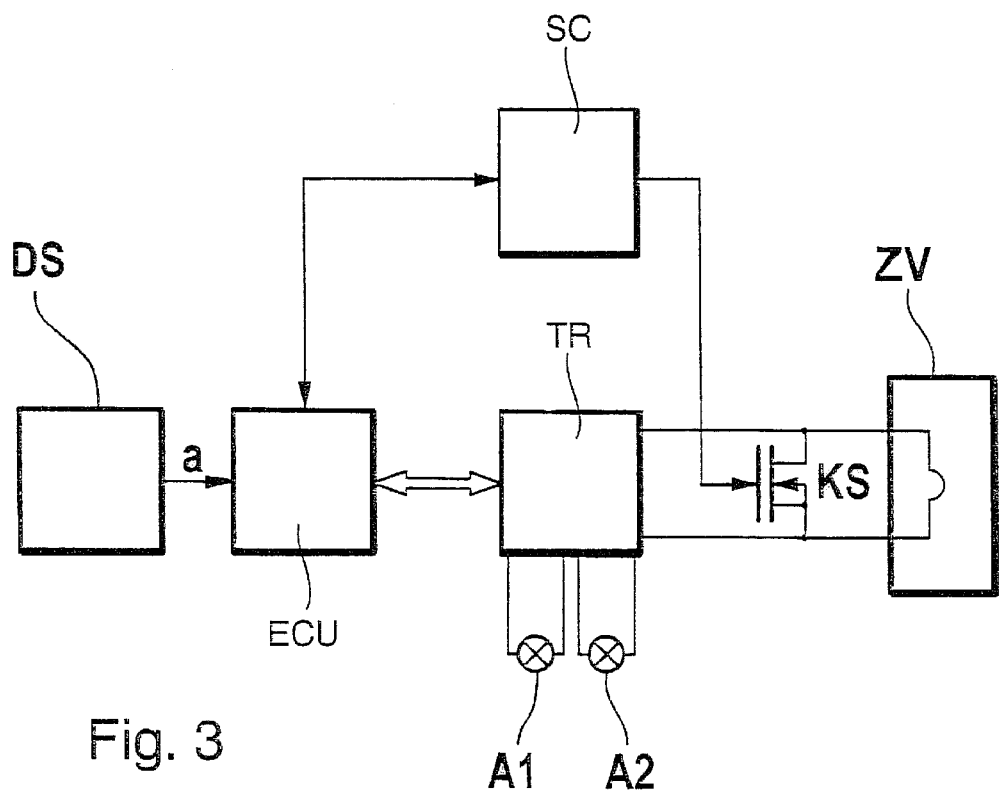
FIG. 3 shows a block diagram of a second embodiment for driving the firing device of an airbag.

As can be seen in a further exemplary embodiment shown in FIG. 3, in addition to the circuit blocks already described, further circuit means SC are provided which trigger short-circuiting switch KS instead of driver circuit TR. This circuit means SC keeps short-circuiting switch KS closed continuously, so that firing device ZV is short-circuited and no current can flow across firing device ZV.

There are only two situations in which circuit means SC opens short-circuiting switch KS. The one situation is when circuit means SC receives information from control unit ECU that, because of a vehicle crash, the airbag should be triggered. However, if information a from deactivation means DS exists in control unit ECU that, because of a special type of seat occupancy, the airbag must not be triggered, then the short circuit of firing device ZV is maintained in this case, as well. The second situation in which short-circuiting switch KS is opened by circuit means SC is when control unit ECU carries out a diagnosis of firing device ZV. To that end, at predefined time intervals of, for example, 1s, short-circuiting switch KS is opened for a duration of approximately 20 μs. This time is shorter than the minimal preferred time which the firing device needs to trigger in response to the flow of a sufficiently large current. Therefore, given a short circuit on a line of firing device ZV to ground and full firing current of 1.75 A of unknown origin, an unwanted triggering cannot occur.

In addition to the described driving for the firing device, circuit means SC can also have the function of a triggering-plausibility verification.

What is claimed is:

1. A system for deactivating a firing device for an airbag installed in a vehicle, comprising:
   a switch for bypassing the firing device; and
   a circuit arrangement for preventing a current flow through the firing device during a desired deactivation time, the circuit arrangement electrically controlling the switch, the switch short-circuiting an electric circuit of the firing device during the deactivation time.

2. The system according to claim 1, further comprising means for signaling situations in which the firing device must not be triggered.

3. The system according to claim 2, wherein the means for signaling includes a switch operable by hand.

4. The system according to claim 2, wherein the means for signaling includes a sensor mechanism which detects a type of seat occupancy.

5. The system according to claim 2, wherein the means for signaling cooperates with a detent device by which a child seat is able to be located in position on a front passenger seat of a vehicle, and the means for signaling signals a non-triggering case when the detent device is engaged.

6. The system according to claim 1, wherein the circuit arrangement keeps the switch closed continuously, so that the firing device is short-circuited, and the circuit arrangement opens the switch only when one of a triggering and a diagnosis of the firing device is to be carried out.

7. The system according to claim 6, wherein, for the diagnosis of the firing device, the circuit arrangement opens the switch at predefined time intervals for a duration of about 20 μs.

8. The system according to claim 1, wherein the switch includes a field-effect transistor.

9. The system according to claim 1, further comprising a visual display for lighting up in response to a short circuit of the electric circuit of the firing device.

10. The system according to claim 1, further comprising a visual display for lighting up in response to a malfunction of the switch.

* * * * *